United States Patent [19]
Link et al.

[11] Patent Number: 5,775,712
[45] Date of Patent: Jul. 7, 1998

[54] METHOD AND APPARATUS TO AUTOMATICALLY CONVERT TRAILER MARKER LIGHTS TO FLASHING HAZARD LIGHTS UPON DISRUPTION OF TRAILER LIGHTING POWER SUPPLIED FROM A TOWING VEHICLE

[76] Inventors: Richard L. Link, 2136 Char Ming Ave.; Richard S. Link, 7410 Dorr St., both of Toledo, Ohio 43615

[21] Appl. No.: 647,635

[22] Filed: May 15, 1996

Related U.S. Application Data

[60] Provisional application No. 60/008,320 Dec. 7, 1995.
[51] Int. Cl.⁶ ..................................................... B60D 1/62
[52] U.S. Cl. ..................... 280/422; 362/183; 340/431; 340/471
[58] Field of Search ................. 280/422, 446.1, 280/734, 735; 340/431, 472, 473, 475; 362/183

[56] References Cited

U.S. PATENT DOCUMENTS

| 3,882,449 | 5/1975 | Bouchard et al. | 340/471 |
|---|---|---|---|
| 4,066,996 | 1/1978 | Davis | 340/431 |
| 4,117,280 | 9/1978 | Feaster | 200/6 |
| 4,857,807 | 8/1989 | Hargis | 340/431 |
| 5,149,176 | 9/1992 | Eccleston | 303/20 |
| 5,289,103 | 2/1994 | Eccleston | 320/32 |
| 5,293,014 | 3/1994 | Perret | 200/148 |
| 5,352,028 | 10/1994 | Eccleston | 303/20 |
| 5,363,303 | 11/1994 | Kaneko et al. | 364/424.05 |
| 5,371,487 | 12/1994 | Hoffman et al. | 340/425.5 |
| 5,375,056 | 12/1994 | Nitschke et al. | 364/424.03 |

OTHER PUBLICATIONS

"A Guide to Fleet Safety, Part 3—Safety Specifications" Published in Heavy Duty Trucking, Jul. 1995.

Primary Examiner—Jesus D. Sotelo
Attorney, Agent, or Firm—David C. Purdue; John C. Purdue

[57] ABSTRACT

Apparatus for providing emergency actuation of lights on a trailer is disclosed. The apparatus comprises an electrical input connector for electrically connecting the apparatus with the plug of a towing vehicle lighting pigtail, an electrical output connector for electrically connecting the apparatus with an electrical connector of a trailer lighting harness, a battery, a battery charging circuit operable to receive power from a towing vehicle through the electrical input connector and to charge the battery, and a control circuit comprising a flasher and a solenoid switch. The control circuit is operable, in a first mode, to electrically connect the towing vehicle lighting pigtail with the trailer lighting harness with a towing vehicle lighting harness and operable, in a second mode, to connect the battery of the apparatus, through the flasher, to the trailer lighting harness. The solenoid switch switches the control circuit from the first mode to the second mode when no power is delivered to the electrical input connector. The control circuit may include an actuation switch. When the apparatus is connected to the towing vehicle lighting pigtail and actuated by the switch with the lights of the towing vehicle turned off, the apparatus will cause the trailer lights to flash until the towing vehicle lights are actuated. The trailer lights will thereafter be controlled by the lighting controls in the towing vehicle until such time as the towing vehicle lighting pigtail stops delivering power to the electrical input connector of the apparatus.

4 Claims, 2 Drawing Sheets

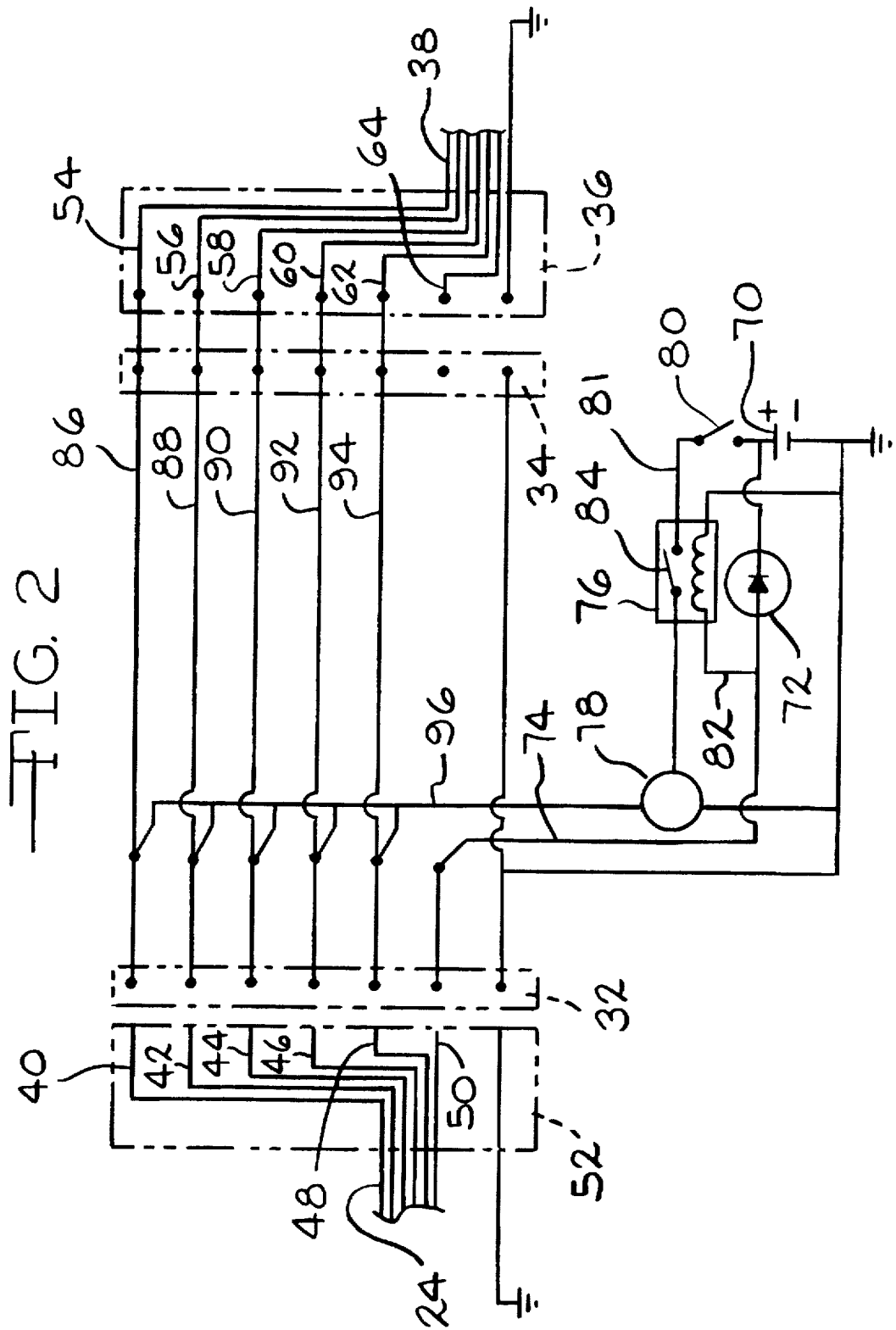

METHOD AND APPARATUS TO AUTOMATICALLY CONVERT TRAILER MARKER LIGHTS TO FLASHING HAZARD LIGHTS UPON DISRUPTION OF TRAILER LIGHTING POWER SUPPLIED FROM A TOWING VEHICLE

REFERENCE TO RELATED PROVISIONAL PATENT APPLICATION

This application claims the benefit, under 37 C.F.R. Section 1.78 and 35 U.S.C. Section 119(e)(1), of the applicants' prior U.S. provisional patent application Ser. No. 60/008,320 filed Dec. 7, 1995.

FIELD OF THE INVENTION

This invention relates generally to the field of safety devices for towed vehicles. More specifically, the invention is directed to back-up, fail-safe emergency lighting apparatus for use on towed vehicles. The apparatus is connected electrically in the trailer lighting circuit, between the towing vehicle and the towed vehicle lights and, upon interruption or disruption of the lighting power from the towing vehicle, the apparatus is operable to energize the marker lights on the towed vehicle. The apparatus will reduce accidents caused by the failure of other drivers to observe parked or disabled trailers.

BACKGROUND OF THE INVENTION

The Federal government, many state governments, insurance companies and the trucking industry are continually seeking ways to improve road safety. A number of accidents, with attendant loss of revenues and life, occur in this country each year when vehicles strike disabled, poorly visible trailers. An article entitled "A Guide to Fleet Safety, Part 3—Safety Specifications" published in Heavy Duty Trucking, July 1995, and numerous other articles are filled with requests for suggestions describing ways to prevent accidents involving tractor trailer rigs. Meanwhile, the trucking industry is carrying increasing amounts of hazardous, toxic, and nuclear wastes over the public roadways.

Current Federal regulations require in the event of a failure or accident, that the driver activate his hazard lights and place passive warning devices along the roadway at varying distances from the trailer as soon as possible, but no less than ten minutes after the tractor/trailer rig has stopped. In conventional rigs, a hazard light switch is operated by the driver in the tractor. It activates only the tail and brake lights; these lights are located low on the rear of the trailer. Under the best of circumstances, therefore, a driver who wishes to cautio approaching motorists must leave the tractor connected to the trailer, and activate a few lights that have limited visibility. The regulations presume, of course, that the driver has not been disabled.

Any disruption of the trailer lighting circuit, including the battery and switches in the tractor, renders the entire trailer lighting system inoperable. Further, a driver who is injured or otherwise disabled may be unable to activate the hazard lights in an emergency and probably would not be able to place the passive markers.

For many years, nuclear waste materials have been temporarily stored at nuclear power plants while the federal and state governments have worked to provide permanent storage locations. Centralized locations have now been identified. Today, more and more radioactive waste is being moved over the public roadways. Except for routing and packaging requirements, there is no difference in government regulation of the transportation, in a tractor trailer rig, of cargo comprising nuclear materials and cargo comprising vegetables.

During a review of patents relating to electrical controls, systems, and devices, particularly for towed vehicles, several patents, discussed below, were noted.

U.S. Pat. No. 4,117,280 (Feaster) discloses improved miniature DIP switches utilized principally on circuit boards containing integrated circuit chips. The disclosed DIP switches are said to have improved reliability and are made by an improved manufacturing process.

U.S. Pat. No. 5,149,176 (Eccleston I) discloses an improved apparatus for controlling electric brake systems in towed recreational trailers. The apparatus includes a visual indicator to indicate the status of the operational condition between an electronic controller and the vehicle brakes.

U.S. Pat. No. 5,289,103 (Eccleston II) discloses apparatus for controlling an electrical charging system in a towing vehicle as it supplies power to a battery in a towed recreational trailer.

U.S. Pat. No. 5,352,028 (Eccleston III) discloses an improved electronic controller for braking systems on recreational trailers, designed to overcome the complexity of factoryinstalled systems with anti-lock brakes.

U.S. Pat. No. 5,293,014 (Perret) discloses an improved circuit breaker design to effect changes in voltage to overcome interruptions in capacitive currents. However, it offers no provision to overcome any loss of power affecting the operation of any system it controls.

U.S. Pat. No. 5,363,303 (Kaneko) discloses improved controllers for air bag actuation. The controllers include sensors which control the activation of air bags through signals related to the acceleration and deceleration of a motor vehicle.

U.S. Pat. No. 5,371,487 (Hoffman) discloses apparatus including a plurality of sensors for producing sensor signals representing one of a number of states of a parameter and a device operable to provide an indication that one or more of the sensor signals has changed. The system, which can be used on vehicles, alerts a technician to a fault or failure of a system but does not include means f or correcting a fault or failure.

U.S. Pat. No. 5,375,056 (Nitschike) discloses simplified apparatus for detecting faults in an electrical control of a motor vehicle's power system.

In the field of towed vehicle braking, there is a commercially available product, marketed under the name Tekonsha 2010 Breakaway Switch. The product comprises a battery for mounting on the towed vehicle and a breakaway switch. If a towed trailer "breaks away" from the towing vehicle, a lanyard closes the breakaway switch and supplies power from the battery to the brakes. This product provides emergency braking, but only if the towinig vehicle and the towed vehicle physically separate.

Research to date has failed to uncover an apparatus for providing emergency trailer light flashing automatically, in the event of a problem with the tractor components of a trailer lighting system and manually, by a driver from the cab of a tractor.

SUMMARY OF THE INVENTION

The present invention is directed to apparatus for providing emergency actuation of lights on a trailer. The apparatus comprises an electrical input connector for electrically connecting the apparatus with the plug of a towing vehicle lighting pigtail, an electrical output connector for electrically connecting the apparatus with an electrical connector of a trailer lighting harness, a battery, a battery charging circuit operable to receive power from a towing vehicle th rough the electrical input connector and to charge the battery, and a control circuit comprising a flasher and a solenoid switch. The control circuit is operable, in a first mode, to electrically connect the towing vehicle lighting pigtail with the trailer lighting harness with a towing vehicle lighting harness and operable, in a second mode, to connect the battery of the apparatus, through the flasher, to the trailer lighting harness. The solenoid switch switches the control circuit from the first mode to the second mode when no power is delivered to the electrical input connector. The control circuit may include an actuation switch. When the apparatus is connected to the towing vehicle lighting pigtail and actuated by the switch with the lights of th e towing vehicle turned off, the apparatus will cause the trailer lights to flash until the towing vehicle lights are actuated. The trailer lights will thereafter be controlled by the lighting controls in the towing vehicle until such time as the towing vehicle lighting pigtail stops delivering power to the electrical input connector of the apparatus. This means that the driver of the tractor can actuate the apparatus to cause emergency trailer lights flashing by turning off the lights in the tractor.

Accordingly, it is an object of the present invention to provide apparatus f or towed vehicles which automatically causes towed vehicle lights to flash when no power is delivered to t he towed vehicle lighting harness.

It is a further object of the present invention to provide an immediate e and automatic warning to other motorists of a potentially hazardous condition.

It is yet another object of the invention to provide a trailer warning light actuation apparatus which does not rely upon the tractor battery or any other tractor components of the trailer lighting circuits.

It is still another object of the present invention to provide a trailer warning light apparatus which flashes not only trailer hazard lights but all of the trailer lights in an emergency.

It is another object of the present invention to provide apparatus for flashing the lights of a trailer which can be activated by a driver in a tractor which is towing the trailer.

These and other objects will be apparent to those skilled in the art from the following detailed description of the instant invention.

If the driver wishes to cause his trailer lights to flash, he may do so by simply operating his light switch in the tractor. This will interrupt the normal power to the trailer, causing the controller to operate the lights in the flashing mode. Similarly, if the trailer is to be parked in an area where it might create a hazard, the driver can operate a switch on the controller, causing all lights to flash without any connection to a tractor.

BRIEF DESCRIPTION OF THE DRAWINGS

FIG. 2 is a partially schematic drawing of apparatus according to the present invention, installed in a conventional trailer lighting circuit.

DESCRIPTION OF THE PREFERRED EMBODIMENT

Figure 1:
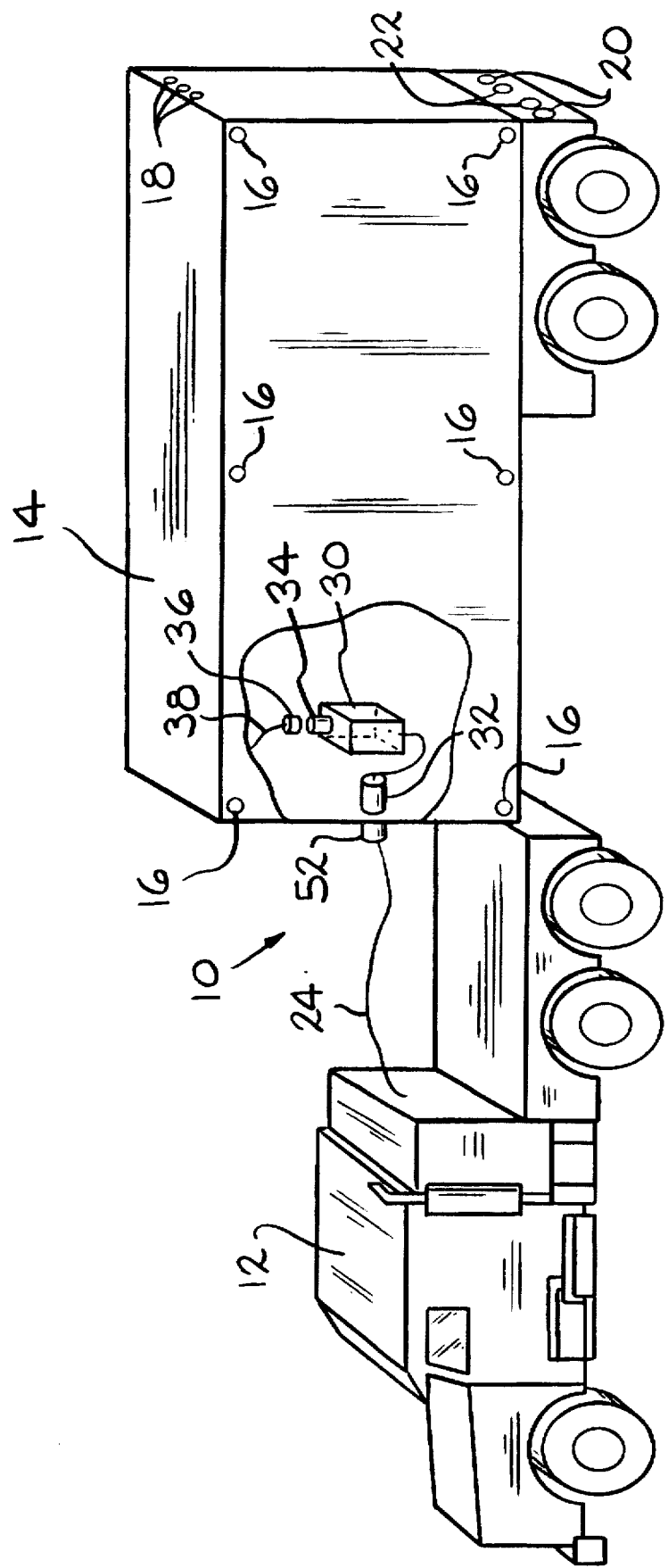
FIG. 1 is a side view of a tractor trailer rig including emergency trailer light flashing apparatus according to the present invention.

Referring to FIG. 1, a tractor trailer rig indicated generally at 10 comprises a tractor 12 and a trailer 14. The trailer is equipped with side marker lights 16, rear marker lights 18, tail/turn lights 20 and brake lights 22. The trailer lighting system is conventional in that it is normally powered by a battery (not shown) and controlled by switches (not shown), all of which are carried in the tractor 12. Trailer lighting power, controlled by the switches in the tractor, is distributed to the trailer light circuits through a pigtail 24.

Apparatus according to the invention is indicated generally at 30. The apparatus 30 comprises an electrical input connector 32 for electrically connecting the apparatus with the plug (not shown) of the tractor lighting pigtail 24. An electrical output connector 34 is provided on the apparat us 30 for electrically connecting the apparatus 30 with a n electrical connector 36 of a trailer lighting harness, a portion of which is indicated at 38.

Referring now to FIG. 2, further details of the construction of the apparatus 30 as well as some details of a conventional trailer lighting system will now be described. The conventional tractor pigtail 24 contains conductors for the various trailer lighting circuits including the side and rear marker lights, indicated at 40, the trailer tail lights, indicated at 42, the right turn light(s), indicated at 44, the brake lights, indicated at 46, the left turn lights, indicated at 48, and an auxiliary circuit indicated at 50. The pigtail 24 terminates in an electrical connector 52, shown in dotted lines, which is adapted to mate with the electrical connector 36 of the trailer lighting circuit harness 38 which includes conductors connected to the various trailer lighting circuits including the side and rear marker lights, indicated at 54, the trailer tail lights, indicated at 56, the right turn light(s), indicated at 58, the brake lights, indicated at 60, the left turn lights, indicated at 62, and an auxiliary circuit indicated at 64. In a conventional tractor trailer lighting system, the connectors 36 and 52 are connected and electrically connect the trailer lighting circuits identified above with the trailer lighting controls and the battery carried in the trailer.

The electrical input connector 32 of the apparatus 30 is configured to connect to the electrical connector 52 of the tractor pigtail. The electrical output connector 34 of the apparatus 30 is configured to connect to the electrical connector 36 of the trailer lighting circuit harness 38.

The apparatus 30 further comprises a power source, such as a battery 70, and a battery charging circuit element 72 operable to receive power from the auxiliary lighting circuit 50 through the electrical input connector 32 and a conductor 74. The battery charging circuit element preferably is a regulated diode which charges the battery 70 whenever power is delivered from the auxiliary lighting circuit 50 to the conductor 74, i.e., when the trailer lights are turned on and the connector 52 is connected to the electrical input connector 32. The apparatus 30 includes a flasher circuit comprising a solenoid switch 76, a flasher element 78 and, preferably, a manual switch 80. The switch is operable, in a first position, and inoperable, in a second position, to conduct power from the battery 70 through a conductor 81 to the solenoid switch 76.

With the apparatus 30 connected between the connectors 36 and 52, the switch 80 closed and the trailer light circuit switch (carried in the tractor; not shown) actuated, auxiliary power is delivered through conductor 74, through a conductor 82 to the solenoid switch 76 and maintains a switch 84 in the solenoid switch 76 in an open condition. In this mode, hereinafter referred to as the first mode, the flasher circuit is inoperative and a conductor 86 electrically connects conductors 40 and 54, a conductor 88 electrically connects conductors 42 and 56, a conductor 90 electrically connects conductors 44 and 58, a conductor 92 electrically connects conductors 46 and 60 and a conductor 94 electrically connects conductors 48 and 62. Further, as discussed above, auxiliary power is delivered through the battery charging circuit element 72 to the battery 70, thereby maintaining it in a charged condition. In this mode, the apparatus 30 is essentially invisible to the trailer lighting circuit with the possible exception of a small drain of auxiliary power for battery charging purposes.

In the event that there is a disruption in the auxiliary power such that auxiliary power is not delivered to the conductor 74, the solenoid switch 76 will not receive power and the switch 84 will close and the apparatus 30 will begin operating in a second mode. In this event, power will be delivered through the flasher element 78, and a pulsed voltage output from the element 78 will be carried through a flasher bus 96 to each of the conductors 86, 88, 90, 92 and 94. As a consequence, the pulsed voltage output of the flasher element 78 will be delivered to the trailer lighting harness 38 causing all lights on the trailer to flash.

It will be appreciated by those skilled in the art that a disruption of auxiliary power delivery to the conductor 74 can be caused by several circumstances. In the first place, the driver in the tractor can turn off the trailer lights. In addition, the tractor and trailer could separate causing the connector 52 to separate from the connector 32. In these and other circumstances, the apparatus 30 will be operable to cause the trailer lights to flash.

It is preferred that the apparatus 30 be permanently mounted in the trailer it services. In operating the apparatus 30, a driver would connect the connectors 52 and 32 activate the apparatus by closing the manual switch 80. The apparatus will cause all lights on the trailer to flash, providing a visual verification that the apparatus 30 and the lamps in the trailer lights are operating properly. The driver would then get into the tractor, turn on the trailer light switch causing the apparatus to operate in the first mode.

The foregoing description is intended to enable one skilled in the art to practice the present invention and sets forth the best mode presently known to the inventors. Undoubtedly, numerous variations and modifications will occur to those skilled in the art and such modifications may be resorted to without departing from the spirit and scope of the invention disclosed herein and claimed below.

We claim:

1. A device operable, in a first mode, to transmit lighting power from a towing vehicle through an electrical connector of the towing vehicle to an electrical connector of a trailer lighting harness, lighting pigtail, and operable, in a second mode, to deliver power from a battery carried on the trailer, in a pulsed output, to the electrical connector of the trailer lighting harness, lighting pigtail to provide emergency actuation of lights on the trailer, said device comprising an electrical input connector for electrically connecting a plurality of input conductors, including an auxiliary lighting power conductor, in the device, with the electrical connector of the towing vehicle lighting pigtail, an electrical output connector for electrically connecting a plurality of output conductors in the device with the electrical connector of the trailer lighting harness, a plurality of conductors connected to deliver, when the device is operating in the first mode, power from said plurality of input conductors to said plurality of output conductors so that the trailer lights operate in normal fashion and the device does not interfere with the normal operation of the towing vehicle lights, a battery charging circuit operable to receive power from said auxiliary lighting power conductor and to charge a battery carried on the trailer, a flasher element including conductors and selectively operable to receive power from a battery carried on the trailer and to deliver a pulsed output through at least one of said output conductors to the electrical connector of the trailer lighting harness, a battery output conductor for delivering the output of a battery carried on the trailer to said flasher element, a control circuit comprising a switch, said switch being operably connected to receive power from the auxiliary lighting power conductor and, when it is receiving power, to cause the device to operate in the first mode wherein said plurality of input conductors are electrically connected to said plurality of output conductors so that the trailer lights operate in normal fashion, said switch being operable, when it fails to receive power, to cause the device to operate in the second mode wherein said battery output conductor is operable, when it is connected to a battery carried on the trailer, to deliver the output of the battery to said flasher element through said switch and said flasher element is operable to deliver a pulsed output to said plurality of output conductors.

2. The device claimed in claim 1 which includes a second switch operable in a first position and inoperable in a second position to interrupt the delivery of the pulsed output of the flasher element to said at least one of said plurality of output conductors when said device is operating in the second mode.

3. The device claimed in claim 1 which further comprises a battery connected to said battery output conductor.

4. The device claimed in claim 3 which includes a second switch operable in a first position and inoperable in a second position to interrupt the delivery of the pulsed output of the flasher element to said at least one of said plurality of output conductors when said device is operating in the second mode.

* * * * *